United States Patent
Kano et al.

(10) Patent No.: US 11,271,252 B2
(45) Date of Patent: *Mar. 8, 2022

(54) LITHIUM SECONDARY BATTERY INCLUDING NONAQUEOUS ELECTROLYTE HAVING LITHIUM-ION CONDUCTIVITY

(71) Applicant: Panasonic Intellectual Property Management Co., Ltd., Osaka (JP)

(72) Inventors: Akira Kano, Osaka (JP); Ryohei Miyamae, Osaka (JP); Kiyohiro Isii, Osaka (JP); Kensuke Nakura, Osaka (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 16/383,244

(22) Filed: Apr. 12, 2019

(65) Prior Publication Data

US 2019/0372171 A1    Dec. 5, 2019

(30) Foreign Application Priority Data

May 31, 2018  (JP) .............................. JP2018-105700

(51) Int. Cl.
  H01M 10/0587 (2010.01)
  H01M 4/134 (2010.01)
  (Continued)

(52) U.S. Cl.
  CPC ....... H01M 10/0587 (2013.01); H01M 4/134 (2013.01); H01M 4/382 (2013.01);
  (Continued)

(58) Field of Classification Search
  None
  See application file for complete search history.

(56) References Cited

U.S. PATENT DOCUMENTS

2006/0110661 A1    5/2006  Lee et al.
2009/0317721 A1*  12/2009  Shirane ............... H01M 4/1395
                                                      429/231.95
(Continued)

FOREIGN PATENT DOCUMENTS

JP    2001-243957    9/2001
JP    2006-156351    6/2006
JP    2016-527680    9/2016

OTHER PUBLICATIONS

The Extended European Search Report dated Aug. 2, 2019 for the related European Patent Application No. 19166469.7.

*Primary Examiner* — Carmen V Lyles-Irving
(74) *Attorney, Agent, or Firm* — McDermott Will and Emery LLP

(57) ABSTRACT

A lithium secondary battery includes an electrode group and a nonaqueous electrolyte having lithium ion conductivity. A negative electrode includes a negative electrode current collector. The negative electrode current collector has a first surface facing an outward direction of winding of the electrode group and a second surface facing an inward direction of the winding of the electrode group. Lithium metal is deposited on the first surface and the second surface by charge. The negative electrode further includes first protrusions protruding from the first surface and second protrusions protruding from the second surface. A ratio $A_{1X}/A_1$ is greater than a ratio $A_{2X}/A_2$. $A_{1X}$ is a sum of projected areas of the first protrusions on the first surface. $A_1$ is an area of the first surface. $A_{2X}$ is a sum of projected areas of the second protrusions on the second surface. $A_2$ is an area of the second surface.

8 Claims, 4 Drawing Sheets

(51) Int. Cl.
   *H01M 4/38*     (2006.01)
   *H01M 10/052*   (2010.01)
   *H01M 4/02*         (2006.01)

(52) U.S. Cl.
   CPC .... *H01M 10/052* (2013.01); *H01M 2004/021* (2013.01); *H01M 2004/025* (2013.01)

(56)            References Cited

U.S. PATENT DOCUMENTS

| | | | |
|---|---|---|---|
| 2015/0280212 A1 | 10/2015 | Son et al. | |
| 2019/0372091 A1* | 12/2019 | Kano | H01M 10/0525 |
| 2019/0372124 A1* | 12/2019 | Kano | H01M 10/052 |
| 2019/0372170 A1* | 12/2019 | Kano | H01M 10/052 |

* cited by examiner

LITHIUM SECONDARY BATTERY INCLUDING NONAQUEOUS ELECTROLYTE HAVING LITHIUM-ION CONDUCTIVITY

BACKGROUND

1. Technical Field

The present disclosure relates to a lithium secondary battery including a nonaqueous electrolyte having lithium ion-conductivity.

2. Description of the Related Art

Nonaqueous electrolyte secondary batteries are used in applications such as information and communication technologies (ICT) including personal computers and smartphones, on-vehicle applications, and electricity storage applications. In such applications, the nonaqueous electrolyte secondary batteries are required to have further increased capacity. Lithium ion batteries are known as high-capacity nonaqueous electrolyte secondary batteries. The increase in capacity of the lithium ion batteries can be achieved using a combination of, for example, graphite and an alloy active material such as a silicon compound as a negative electrode active material. However, the increase in capacity of the lithium ion batteries is reaching a limit.

Lithium secondary batteries are promising nonaqueous electrolyte secondary batteries with capacity higher than that of the lithium ion batteries. In a lithium secondary battery, lithium metal is deposited on a negative electrode during charge and is dissolved in a nonaqueous electrolyte during discharge.

In the lithium secondary batteries, the improvement in shape of negative electrode current collectors has been investigated from the viewpoint of reducing the deterioration of battery characteristics due to the dendritic deposition of lithium metal. For example, Japanese Unexamined Patent Application Publication No. 2001-243957 (hereinafter referred to as Patent Document 1) proposes that the ten-point average roughness Rz of a lithium-metal-deposited surface of a negative electrode current collector is set to 10 μm or less. Japanese Unexamined Patent Application Publication (Translation of PCT Application) No. 2016-527680 (hereinafter referred to as Patent Document 2) proposes that a negative electrode including a porous metal current collector and lithium metal stored in pores of the current collector is used in a lithium secondary battery. Japanese Unexamined Patent Application Publication No. 2006-156351 (hereinafter referred to as Patent Document 3) proposes that a negative electrode current collector having a surface provided with a plurality of concave recesses with a predetermined shape is used in a lithium metal polymer secondary battery.

SUMMARY

One non-limiting and exemplary embodiment provides a lithium secondary battery in which the expansion of a negative electrode during charge is reduced in a wound electrode group.

In one general aspect, the techniques disclosed here feature a lithium secondary battery which includes an electrode group and a nonaqueous electrolyte having lithium ion conductivity. The electrode group includes a positive electrode, a negative electrode, and a separator disposed between the positive electrode and the negative electrode. The positive electrode contains a positive electrode active material containing lithium. The negative electrode includes a negative electrode current collector. The positive electrode, the negative electrode, and the separator of the electrode group are wound. The negative electrode current collector has a first surface facing an outward direction of the winding of the electrode group and a second surface facing an inward direction of the winding of the electrode group. Lithium metal is deposited on the first surface and the second surface by charge. The negative electrode further includes first protrusions protruding from the first surface and second protrusions protruding from the second surface. A ratio $A_{1X}/A_1$ is greater than a ratio $A_{2X}/A_2$. $A_{1X}$ is a sum of projected areas of the first protrusions on the first surface. $A_1$ is an area of the first surface. $A_{2X}$ is a sum of projected areas of the second protrusions on the second surface. $A_2$ is an area of the second surface.

According to an embodiment of the present disclosure, in a lithium secondary battery including a wound electrode group, the expansion of a negative electrode due to charge can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
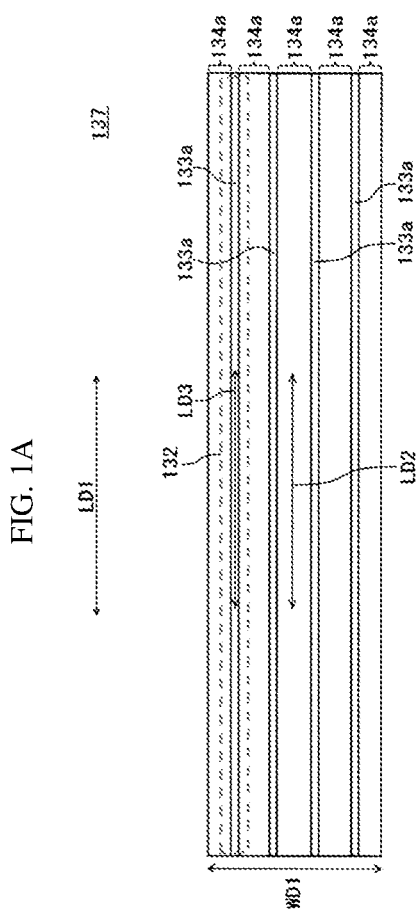
FIG. 1A is a schematic plan view of a negative electrode used in a lithium secondary battery according to an embodiment of the present disclosure and is also an outline view of the negative electrode viewed from a first surface of a negative electrode current collector.

Underlying Knowledge Forming Basis of the Present Disclosure

An embodiment of the present disclosure relates to a lithium secondary battery in which lithium metal is used as a negative electrode active material and which includes a wound electrode group. In particular, an embodiment of the present disclosure relates to an improvement in a negative electrode current collector used in the wound electrode group. Incidentally, the lithium secondary battery is referred to as a lithium metal secondary battery in some cases. In the lithium secondary battery, lithium metal is dendritically deposited on a negative electrode during charge in some cases. Furthermore, the formation of dendrites increases the specific surface area of the negative electrode to promote side reactions in some cases. Therefore, the discharge capacity and cycle characteristics are likely to be reduced. In this regard, Patent Document 1 suggests that the formation of dendrites is reduced by setting the ten-point average roughness Rz of a lithium-metal-deposited surface of a negative electrode to 10 μm or less, whereby high charge-discharge efficiency is obtained.

The lithium secondary battery is a battery in which the amount of expansion of the negative electrode is likely to be large because lithium metal is deposited on the negative electrode during charge. The term "the expansion of the negative electrode" as used herein means that the sum of the volume of the negative electrode and the volume of deposited lithium metal increases. In particular, in the case where lithium metal is dendritically deposited, the expansion thereof is larger. In the case of a cylindrical lithium battery including a wound electrode group, stress is caused by the excessive expansion of a negative electrode. Patent Document 2 proposes that, for example, a porous negative electrode current collector, made of copper or nickel, having a porosity of 50% to 99% and a pore size of 5 μm to 500 μm is used to absorb the change in volume of a negative electrode during charge or discharge. The negative electrode current collector described in Patent Document 3 is provided with the recesses for the purpose of ensuring spaces for forming lithium metal dendrites.

In a coin-shaped electrode group, the stress caused by the deposition of lithium metal is released from principal surfaces and side surfaces of a negative electrode. In a stacked electrode group, the stress caused by the deposition of lithium metal is released from end portions of a negative electrode. In a wound electrode group, the stress due to tensile strain is caused by the deposition of lithium metal in a circumferential direction of a cross section perpendicular to the winding axis of the wound electrode group. In the wound electrode group, the stress caused by the deposition of lithium metal is less likely to be released from the inner circumference side of the wound electrode group and end portions of a negative electrode and is therefore directed to the outer circumference side of the wound electrode group. As described above, in the wound electrode group, stress is less likely to be distributed as compared to other coin-shaped or stacked electrode groups and therefore the excessive expansion of the negative electrode is likely to occur.

A negative electrode current collector of the wound electrode group has a first surface facing the outward direction of the winding of the wound electrode group and a second surface facing the inward direction of the winding of the wound electrode group. That is, the first surface faces a direction away from the winding axis of the wound electrode group with respect to the negative electrode current collector and the second surface faces a direction toward the winding axis of the wound electrode group with respect to the negative electrode current collector. In the negative electrode current collector, a side facing the outward direction of the winding of the wound electrode group and a side facing the inward direction of the winding of the wound electrode group are hereinafter referred to as the outside and the inside, respectively, in some cases. In the wound electrode group, the stress due to tensile strain applies a higher pressure to lithium metal deposited on the first surface, which is the outside of the negative electrode current collector, by charge than to lithium metal deposited on the second surface, which is the inside thereof, by charge. Lithium metal deposited on the first surface is compressed by the high pressure. However, lithium metal deposited on the second surface is less likely to be compressed. Lithium metal deposited on the second surface has a larger thickness as compared to lithium metal deposited on the first surface.

As described above, in the wound electrode group, the stress caused by the deposition of lithium metal is directed from the inner circumference side to the outer circumference side. Therefore, the pressure applied to a surface of the negative electrode current collector by the stress is higher on the second surface, which is the inside of the negative electrode current collector in the wound electrode group, than on the first surface, which is the outside thereof. The pressure applied to a surface of the negative electrode current collector is hereinafter referred to as surface pressure in some cases. When the difference in surface pressure between the first surface and the second surface is excessively large, the deposition of lithium metal on a surface of the negative electrode is likely to be uneven and therefore the negative electrode locally excessively expands in some cases. Furthermore, the charge-discharge efficiency decreases in some cases.

In the negative electrode current collector described in Patent Document 2 or 3, lithium metal is deposited in spaces in pores or recesses by charge. Patent Documents 2 and 3 basically target a stacked or coin-shaped electrode group. Therefore, lithium metal in the pores or the recesses is less likely to receive the pressure generated in the electrode group. Even if the negative electrode current collector described in Patent Document 2 or 3 is used in a wound electrode group, uneven deformation is likely to occur due to winding. As a result, the stress applied to deposited lithium metal is uneven and therefore the expansion of a negative electrode during charge is likely to be uneven. Thus, it is difficult to sufficiently reduce the expansion of the negative electrode during charge. Furthermore, lithium metal in the pores or the recesses is less likely to be stressed and is therefore likely to be separated from a wall of a current collector. Separated lithium metal cannot be dissolved during discharge, leading to a reduction in charge-discharge efficiency.

The inventors have carried out intensive investigations for the purpose of solving the above problems and, as a result, has devised a lithium secondary battery according to the present disclosure. A lithium secondary battery according to an aspect of the present invention includes an electrode group and a nonaqueous electrolyte having lithium ion conductivity. The electrode group includes a positive electrode containing a positive electrode active material containing lithium, a negative electrode including a negative electrode current collector, and a separator disposed between the positive electrode and the negative electrode. The positive electrode, the negative electrode, and the separator are wound. The negative electrode current collector has a first surface and a second surface opposite to the first surface. Lithium metal is deposited on the first surface and the second surface by charge. The first surface is the outside surface of the negative electrode current collector in the electrode group. The second surface is the inside surface of the negative electrode current collector in the electrode group. The negative electrode further includes first protrusions protruding from the first surface and second protrusions protruding from the second surface. The ratio $A_{1X}/A_1$ of the sum $A_{1X}$ of the projected areas of the first protrusions on the first surface to the area $A_1$ of the first surface of the negative electrode current collector is greater than the ratio $A_{2X}/A_2$ of the sum $A_{2X}$ of the projected areas of the second protrusions on the second surface to the area $A_2$ of the second surface of the negative electrode current collector.

According to the above aspect of the present invention, in the electrode group, the first surface, which is the outside of the negative electrode current collector, has the first protrusions and the second surface, which is the inside of the negative electrode current collector, has the second protrusions. Since the first protrusions and the second protrusions can ensure spaces in which lithium metal is deposited in the vicinity of each of the first surface and the second surface, the change in apparent volume of the negative electrode due to the deposition of lithium metal can be reduced. Herein, the apparent volume of the negative electrode is the sum of the volume of the negative electrode, the volume of deposited lithium metal, the volumes of the spaces ensured by the first protrusions and the second protrusions. In the present disclosure, the sum $A_{1X}$ of the projected areas of the first protrusions on the first surface is referred to as the "total area $A_{1X}$ of the first protrusions" or the "sum $A_{1X}$ of the projected areas of the first protrusions" in some cases. Furthermore, in the present disclosure, the sum $A_{2X}$ of the projected areas of the second protrusions on the second surface is referred to as the "total area $A_{2X}$ of the second protrusions" or the "sum $A_{2X}$ of the projected areas of the second protrusions" in some cases.

In the electrode group, the pressure applied to a surface of the negative electrode current collector is greater on an outer circumference-side wound section of the electrode group than on an inner circumference-side wound section of the electrode group because of the stress toward the outer circumference side and the stress from the outside of the electrode group. Therefore, lithium metal deposited on the first surface is more compressed than to lithium metal deposited on the second surface. Thus, it is conceivable that the volume of lithium metal deposited on the second surface is greater than the volume of lithium metal deposited on the first surface. Therefore, a space which is located on the second surface and in which lithium metal is deposited may be larger than a space which is located on the first surface and in which lithium metal is deposited. This enables an increase in volume to be effectively absorbed in spaces between the second protrusions even if the volume of lithium metal deposited on the second surface by charge increases. Thus, the increase in apparent volume of the negative electrode can be reduced.

The size of the space which is located on the first surface and in which lithium metal is deposited is substantially equal to the product of a value obtained by subtracting the total area $A_{1X}$ of the first protrusions from the area $A_1$ of the first surface and the average height $h_1$ of the first protrusions (i.e., $h_1 \times (A_1 - A_{1X})$). Likewise, the size of the space which is located on the second surface and in which lithium metal is deposited is substantially equal to the product of a value obtained by subtracting the total area $A_{2X}$ of the second protrusions from the area $A_2$ of the second surface and the average height $h_2$ of the second protrusions (i.e., $h_2 \times (A_2 - A_{2X})$). Thus, when the total area $A_{1X}$ of the first protrusions and the total area $A_{2X}$ of the second protrusions satisfy the above-mentioned relationship, the space which is located on the second surface and in which lithium metal is deposited can be readily set to be larger than the space which is located on the first surface and in which lithium metal is deposited. Hereinafter, the average height $h_1$ of the first protrusions is referred to as the first average height $h_1$ and the average height $h_2$ of the second protrusions is referred to as the second average height $h_2$ in some cases.

The sum $A_{1X}$ of the projected areas of the first protrusions on the first surface is the sum of the areas of projection images formed by projecting the first protrusions onto the first surface in a thickness direction of the negative electrode current collector. Likewise, the sum $A_{2X}$ of the projected areas of the second protrusions on the second surface is the sum of the areas of projection images formed by projecting the second protrusions onto the second surface in the thickness direction of the negative electrode current collector.

In the calculation of the area $A_1$ of the first surface, the total area $A_{1X}$ of the first protrusions, the area $A_2$ of the second surface, and the total area $A_{2X}$ of the second protrusions, a surface region of the negative electrode current collector that does not face the positive electrode active material need not be taken into account. That is, none of the first surface and the second surface includes the surface region of the negative electrode current collector that does not face the positive electrode active material. Thus, none of the area $A_1$ of the first surface, the total area $A_{1X}$ of the first protrusions, the area $A_2$ of the second surface, and the total area $A_{2X}$ of the second protrusions includes the area of the surface region of the negative electrode current collector that does not face the positive electrode active material.

For example, in the electrode group, at the outermost circumference of winding, an outer region of the negative electrode current collector may not face the positive electrode active material in a certain case. In this case, the outer region, which does not face the positive electrode active material, is not taken into account in the calculation of the area $A_1$ of the first surface and the total area $A_{1X}$ of the first protrusions because lithium metal is less likely to be deposited on the outer region. At the innermost circumference of winding, an inner region of the negative electrode current collector may not face the positive electrode active material in a certain case. In this case, the inner region, which does not face the positive electrode active material, is not taken into account in the calculation of the area $A_2$ of the second surface and the total area $A_{2X}$ of the second protrusions because lithium metal is less likely to be deposited on the inner region. When the width of the negative electrode current collector in a direction parallel to the winding axis is greater than the width of the positive electrode current collector, a band-shaped region of the negative electrode current collector that extends in a longitudinal direction perpendicular to the winding axis does not face the positive electrode active material at an upper end section and/or lower end section of the electrode group (that is, an end section and/or another end section in the direction parallel to the winding axis). In this case, the band-shaped region is not taken into account in the calculation of the above areas.

As described above, on each of the first surface and the second surface, a space with a volume suitable for the thickness of deposited lithium metal by charge can be ensured with the first protrusions and the second protrusions in advance. Therefore, the volume of the negative electrode and/or the positive electrode need not be set to be small at an initial stage in anticipation of the expansion of the negative electrode. As a result, high discharge capacity is likely to be ensured. Even if lithium metal is dendritically formed, lithium metal can be stored in a space in the vicinity of each of the first surface and the second surface. Furthermore, since the electrode group is a winding type, a certain degree of pressure is applied to lithium metal deposited in spaces formed by the first protrusions and the second protrusions. Therefore, lithium metal deposited in the spaces is less likely to be peeled off unlike that described in Patent Document 2 or 3. Thus, the deterioration of the charge-discharge efficiency can be reduced. Since an appropriate pressure is applied to deposited lithium metal, the dendritic deposition of lithium metal can be reduced without smoothing a surface of the negative electrode current collector as described in Patent Document 1.

Suppose that the area of one of principal surfaces of the negative electrode current collector is A and the area of the other principal surface is also A. As described above, when the outermost circumference and/or innermost circumference of the electrode group is the negative electrode current collector, the area $A_1$ of the first surface is less than A by the area of the outermost negative electrode current collector or the area $A_2$ of the second surface is less than A by the area of the innermost negative electrode current collector in some cases. However, as long as the number of turns in the electrode group is sufficiently large, the area $A-A_1$ (i.e., the area of the outermost and/or innermost part of the negative electrode current collector) accounts for a small percentage of A and the area $A-A_2$ (i.e., the area of the innermost and/or outermost part of the negative electrode current collector) accounts for a small percentage of A. Accordingly, the area $A_1$ of the first surface is substantially equal to the area $A_2$ of the second surface. Thus, when the total area $A_{1X}$ of the first protrusions is greater than the total area $A_{2X}$ of the second protrusions (i.e., $A_{1X} > A_{2X}$), the above-mentioned relationship (i.e., $A_{1X}/A_1 > A_{2X}/A_2$) is satisfied. In this case, the ratio $A_{1X}/A_{2X}$ may be 1.3 or more, 1.7 or more, or 2.0 or more.

When the total area $A_{1X}$ of the first protrusions and the total area $A_{2X}$ of the second protrusions satisfy the above-mentioned relationship ($A_{1X}/A_1 > A_{2X}/A_2$), the space which is located on the second surface and in which lithium metal is deposited is greater than the space which is located on the first surface and in which lithium metal is deposited if the first average height $h_1$ is less than or equal to the second average height $h_2$. In view of the ease of manufacturing the negative electrode current collector, which includes the first and second protrusions, the first average height $h_1$ may be substantially equal to the second average height $h_2$. The fact that the first average height $h_1$ is substantially equal to the second average height $h_2$ means that the difference between the first average height $h_1$ and the second average height $h_2$ is 5 μm or less. The term "first average height $h_1$" refers to the arithmetic average height of the first protrusions. The term "second average height $h_2$" refers to the arithmetic average height of the second protrusions.

The first average height $h_1$ can be determined in such a manner that, for example, ten of the first protrusions are arbitrarily selected from a through-thickness cross-sectional image of the negative electrode current collector, the distance from the tip of each selected first protrusion to the first surface is measured in terms of the height of the selected first protrusion, and the heights of the selected first protrusions are averaged. Alternatively, the first average height $h_1$ may be determined in such a manner that a certain area (for example, 5 cm$^2$ or the like) or a plurality of arbitrary regions are cut out of the first surface of the negative electrode current collector and the heights of the first protrusions present in the certain area or the arbitrary regions are averaged. In this case, the first average height $h_1$ may be determined in such a manner that a plurality of cross-sectional images are taken from the certain area or the arbitrary regions, the distance from the first surface to the tip of each first protrusion is measured from the cross-sectional images in terms of the height of the first protrusion, and the heights of the first protrusions are averaged. The first protrusions to be measured may be arranged over the first surface or may be arranged only on a portion of the first surface. When the tip of each first protrusion is not flat, the maximum height from the first surface is set to the height of the first protrusions.

Likewise, the second average height $h_2$ can be determined in such a manner that, for example, ten of the second protrusions are arbitrarily selected from a through-thickness cross-sectional image of the negative electrode current collector, the distance from the tip of each selected second protrusion to the second surface is measured in terms of the height of the selected second protrusion, and the heights of the selected second protrusions are averaged. Alternatively, the second average height $h_2$ may be determined in such a manner that a certain area (for example, 5 cm$^2$ or the like) or a plurality of arbitrary regions are cut out of the second surface of the negative electrode current collector and the heights of the second protrusions present in the certain area or the arbitrary regions are averaged. In this case, the second average height $h_2$ may be determined in such a manner that a plurality of cross-sectional images are taken from the certain area or the arbitrary regions, the distance from the second surface to the tip of each second protrusion is measured from the cross-sectional images in terms of the height of the second protrusion, and the heights of the second protrusions are averaged. The second protrusions to be measured may be arranged over the second surface or may be arranged only on a portion of the second surface. When the tip of each second protrusion is not flat, the maximum height from the second surface is set to the second average height $h_2$.

When the first surface is rough, the roughness Rz of the first surface may be 1 μm or less. Likewise, when the second surface is rough, the roughness Rz of the second surface may be 1 μm or less. The height of each first protrusion may be greater than 1 μm. The height of each second protrusion may be greater than 1 μm. The first protrusions and the second protrusions are measured for height in such a state that the electrode group is unwound and the first surface and the second surface are flattened. When the first surface is rough, the first protrusions are measured for height with reference to the top of rough. Likewise, when the second surface is rough, the second protrusions are measured for height with reference to the top of rough.

Each of the first and second protrusions may be in contact with the separator. In particular, the first protrusions may be in contact with a surface of the separator that faces the first surface and the second protrusions may be in contact with a surface of the separator that faces the second surface. In these cases, the presence of the first and second protrusions ensures spaces between the negative electrode current collector and the separator. Thus, lithium metal is deposited in the spaces during charge. The deposition of lithium metal in the spaces allows the influence of the relationship between the total area $A_{1X}$ of the first protrusions and the total area $A_{2X}$ of the second protrusions to appear significantly. Therefore, even if the volume of lithium metal deposited on the second surface is large, the change in apparent volume of the negative electrode can be reduced. The contact of the separator with the first protrusions and the second protrusions reduces the deposition of lithium metal on the tips of the first and second protrusions. Thus, the local expansion of the negative electrode can be reduced.

The first protrusions protrude from the first surface toward the surface of the separator that faces the first surface. The second protrusions protrude from the second surface toward the surface of the separator that faces the second surface. Material of the first protrusions may be different from material of the negative electrode current collector. Material of the second protrusions may be different from the material of the negative electrode current collector. The first protrusions and the second protrusions may be made of a resin material. In this case, no lithium metal is deposited on the tips of the first and second protrusions and therefore the local expansion of the negative electrode can be reduced. The negative electrode current collector, the first protrusions, and the second protrusions may be made of the same material in one piece.

In each of the first and second surfaces of the negative electrode current collector, a direction perpendicular to the winding axis of the electrode group is defined as a longitudinal direction and a direction parallel to the winding axis is defined as a lateral direction. Hereinafter, in a surface of the negative electrode current collector, the longitudinal direction is referred to as a first longitudinal direction and the lateral direction is referred to as a first lateral direction. The first surface may be provided with at least one band-shaped first region in which no first protrusions are placed along the first longitudinal direction or the first lateral direction. The second surface may be provided with at least one band-shaped second region in which no second protrusions are placed along the first longitudinal direction or the first lateral direction. The presence of the first region and/or the second region allows the nonaqueous electrolyte to be likely to penetrate the inside of the electrode group through these regions. This enables the charge-discharge reaction to be performed over the electrode group; hence, high capacity is likely to be ensured.

The fact that the first region or the second region is placed along the first longitudinal direction means that a band-shaped region in which no first protrusions or second protrusions are placed is present in a direction substantially parallel to the first longitudinal direction. The fact that the first region or the second region is placed along the first lateral direction means that a band-shaped region in which no first protrusions or second protrusions are placed is present in a direction substantially parallel to the first lateral direction. Hereinafter, a band-shaped region of the first surface is referred to as a band-shaped first region and a band-shaped region of the second surface is referred to as a band-shaped second region. A longitudinal direction of each of the band-shaped first region and the band-shaped second region is hereinafter referred to as a second longitudinal direction. The fact that a band-shaped region is present in the above-mentioned "direction substantially parallel to the first longitudinal direction" means that the second longitudinal direction is parallel to the first longitudinal direction and that the acute angle formed by the second longitudinal direction and the first longitudinal direction is 30° or less. The fact that a band-shaped region is present in the above-mentioned "direction substantially parallel to the first lateral direction" means that the second longitudinal direction is parallel to the first lateral direction and that the acute angle formed by the second longitudinal direction and the first lateral direction is 30° or less.

The configuration of the lithium secondary battery according to the above aspect is further described below in detail with appropriate reference to drawings. First, the configuration of the negative electrode is described.

Negative Electrode

The negative electrode includes the negative electrode current collector. The negative electrode current collector has the first surface and the second surface, which is opposite to the first surface. In the electrode group, the first surface and the second surface are the outside surface and inside surface, respectively, of the negative electrode current collector. In the lithium secondary battery, lithium metal is deposited on the first surface and the second surface by charge. In particular, lithium ions contained in the nonaqueous electrolyte receive electrons on the negative electrode current collector during charge to form lithium metal, which is deposited on surfaces of the negative electrode current collector. Lithium metal deposited on surfaces of the negative electrode current collector is dissolved in the nonaqueous electrolyte by discharge in the form of lithium ions. The lithium ions contained in the nonaqueous electrolyte may be those derived from a lithium salt added to the nonaqueous electrolyte, those supplied from the positive electrode active material by discharge, or a mixture of these.

The negative electrode further includes the first protrusions, which protrude from the first surface, and the second protrusions, which protrude from the second surface. The presence of the first and second protrusions enables spaces storing lithium metal deposited in the vicinity of each of the first surface and the second surface to be ensured. Therefore, the expansion of the negative electrode due to the deposition of the lithium metal can be reduced with the spaces. In the negative electrode current collector, the ratio $A_{1X}/A_1$ of the total area $A_{1X}$ of the first protrusions to the area $A_1$ of the first surface is set to be greater than the ratio $A_{2X}/A_2$ of the total area $A_{2X}$ of the second protrusions to the area $A_2$ of the second surface. This enables an increase in volume to be effectively absorbed as described above even if the volume of lithium metal deposited on the second surface by charge increases. Thus, the increase in apparent volume of the negative electrode can be reduced. In the electrode group, a certain degree of pressure is applied to deposit lithium metal and therefore the separation of lithium metal is reduced. As a result, the deterioration of the charge-discharge efficiency is reduced.

The first average height $h_1$ of the first protrusions from the first surface and the second average height $h_2$ of the second protrusions from the second surface are adjusted depending on the total area $A_{1X}$ of the first protrusions and the total area $A_{2X}$ of the second protrusions or depending on the energy density and size of the lithium secondary battery. The first average height $h_1$ may be substantially equal to the second average height $h_2$ or may be less than the second average height $h_2$. When the first average height $h_1$ is less than the second average height $h_2$, the difference between the first average height $h_1$ and the second average height $h_2$ may be 3% or more of the second average height $h_2$ or 10% or more. When the difference therebetween is within such a range, the change in volume of the negative electrode due to the deposition of lithium metal is likely to be absorbed.

The height of each first protrusion may be determined depending on the amount of deposited lithium metal. The height of each second protrusion may also be determined depending on the amount of deposited lithium metal. The second average height $h_2$ may be 15 µm or more, 20 µm or more, or 30 µm or more. Alternatively, the second average height $h_2$ may be 40 µm or more or 50 µm or more. When the second average height $h_2$ is within such a range, the effect of absorbing the change in volume of the negative electrode due to the deposition of lithium metal can be further increased. The effect of protecting the negative electrode can also be increased. The second average height $h_2$ may be 120 µm or less or 110 µm or less. Alternatively, the second average height $h_2$ may be 100 µm or less or 90 µm or less. When the second average height $h_2$ is within such a range, the conductivity between lithium metal and the negative electrode current collector is high because lithium metal deposited on the second surface in the electrode group is appropriately pressed with the separator; hence, the charge-discharge efficiency can be increased. Furthermore, the separator is inhibited from excessively pressing the second protrusions, thereby enabling the negative electrode to be protected. These lower and upper limits may be arbitrarily combined.

The first average height $h_1$ can be selected from the range of the second average height $h_2$. The first average height $h_1$ can be determined such that the difference between the first average height $h_1$ and the second average height $h_2$ is within the above range. At least one of the first protrusions may be in contact with the separator. At least one of the second protrusions may be in contact with the separator. In these cases, lithium metal is deposited in spaces formed between the negative electrode current collector and the separator by charge. The contact of the first and second protrusions with the separator allows the influence of the relationship between the total area $A_{1X}$ of the first protrusions and the total area $A_{2X}$ of the second protrusions to appear significantly and enables the effect of reducing the expansion of the negative electrode to be enhanced. The deposition of lithium metal on portions of the first and second protrusions that are in contact with the separator, that is, the tips of the first and second protrusions or the like, is reduced; hence, the local expansion of the negative electrode can be reduced.

From the viewpoint of further increasing the effect of reducing the expansion of the negative electrode, 80% or more of the sum $A_{1X}$ of the projected areas of the first protrusions on the first surface may be in contact with the separator. From the same viewpoint as the above, 80% or more of the sum $A_{2X}$ of the projected areas of the second protrusions on the second surface may be in contact with the separator. From the same viewpoint as the above, all of the first protrusions and/or all of the second protrusions may be in contact with the separator.

The proportion $(A_{1X}/A_1) \times 100\%$ of the sum $A_{1X}$ of the projected areas of the first protrusions on the first surface in the area $A_1$ of the first surface may be 0.4% or more, 1% or more, or 3% or more. When the above proportion is within such a range, the separator is likely to be supported with the first protrusions and the interval between the first surface and the separator is likely to be maintained constant. Thus, the effect of reducing the expansion of the negative electrode can be enhanced. The proportion $(A_{1X}/A_1) \times 100\%$ of the sum $A_{1X}$ of the projected areas of the first protrusions on the first surface in the area $A_1$ of the first surface may be 70% or less or 50% or less. When the above ratio is within such a range, a space is likely to be ensured between the first surface and the separator and therefore higher capacity can be ensured with the expansion of the negative electrode due to the deposition of lithium metal reduced. These lower and upper limits may be arbitrarily combined.

The proportion $(A_{2X}/A_2) \times 100\%$ of the sum $A_{2X}$ of the projected areas of the second protrusions on the second surface in the area $A_2$ of the second surface may be 0.2% or more, 1% or more, or 3% or more. The proportion $(A_{2X}/A_2) \times 100\%$ of the sum $A_{2X}$ of the projected areas of the second protrusions on the second surface in the area $A_2$ of the second surface may be 68% or less or 50% or less.

The areas $A_1$, $A_{1X}$, $A_2$, and $A_{2X}$ can be determined from the negative electrode current collector in such a state that the first surface and the second surface are flattened. The areas $A_1$, $A_{1X}$, $A_2$, and $A_{2X}$ may be determined from the negative electrode current collector before the electrode group is prepared. Alternatively, in the case where the areas $A_1$, $A_{1X}$, $A_2$, and $A_{2X}$ are determined from the negative electrode current collector taken out of the electrode group, the areas $A_1$, $A_{1X}$, $A_2$, and $A_{2X}$ are partly calculated for predetermined regions and the proportion between the areas determined on the basis of calculated values may be set to the above proportion.

A projection image of each first protrusion on the first surface and a projection image of each second protrusion on the second surface are not particularly limited. From the viewpoint that the separator is likely to be supported and that the nonaqueous electrolyte is likely to be supplied to the vicinity of the negative electrode, the projection image of the first protrusion on the first surface and the projection image of the second protrusion on the second surface may have a line shape or the like. The line shape includes a strip shape. The strip shape refers to one of line shapes that, for the projection image of each protrusion on a surface of the negative electrode current collector, the ratio of the longitudinal length of the protrusion to the lateral length of the protrusion (i.e., longitudinal length/lateral length) is relatively small. The projection image of the first protrusion on the first surface and the projection image of the second protrusion on the second surface are images formed by projecting the first protrusion and the second protrusion onto the first surface and the second surface, respectively, in the thickness direction of the negative electrode current collector.

From the viewpoint of ensuring a space with an appropriate volume for the purpose of storing deposited lithium metal, in the first surface, adjacent two of the first protrusions may be apart from each other to some extent. Likewise, in the second surface, adjacent two of the second protrusions may be apart from each other to some extent. For example, the minimum clearance between the adjacent two of the first or second protrusions may be greater than the maximum width of the adjacent two of the first or second protrusions. In particular, the minimum clearance between the adjacent two of the first or second protrusions may be four times or more the maximum width of the adjacent two of the first or second protrusions, six times or more, or nine times or more. The minimum clearance between the adjacent two of the first protrusions may be set below the minimum clearance between the adjacent two of the second protrusions such that the total area $A_{1X}$ of the first protrusions and the total area $A_{2X}$ of the second protrusions satisfy the above condition $(A_{1X}/A_1 > A_{2X}/A_2)$.

The minimum clearance between the adjacent two of the first or second protrusions refers to the minimum clearance between the outer edges of projection images of adjacent two of the first or second protrusions in the case where adjacent two of the first or second protrusions are arbitrarily selected and are projected on the first or second surface, respectively, in the thickness direction of the negative electrode current collector. The maximum width of the adjacent two of the first protrusions is the maximum of the width of the projection images of the adjacent two of the first protrusions on the first surface. The maximum width of the adjacent two of the second protrusions is the maximum of the width of the projection images of the adjacent two of the second protrusions on the second surface. When the projection images are circular, a larger one of the diameters of the projection images of the adjacent two of the first or second protrusions is set to the maximum width.

The projection images of the first protrusions on the first surface may be line-shaped and longitudinal directions of the first protrusions may be arranged substantially in parallel. Likewise, the projection images of the second protrusions on the second surface may be line-shaped and longitudinal directions of the second protrusions may be arranged substantially in parallel. In these cases, the minimum clearance between the adjacent two of the first or second protrusions may be greater than the maximum width of the adjacent two of the first or second protrusions. In this case, the separator is likely to be supported with the first or second protrusions and a space with an appropriate volume is likely to be ensured between the adjacent two of the first or second protrusions. When the projection images of the first or second protrusions have, for example, a fixed-width line shape, the clearance between the adjacent two of the first or second protrusions can be determined by subtracting the width of the adjacent two of the first or second protrusions from the center-to-center distance between the projection images of the adjacent two of the first or second protrusions.

A longitudinal direction of each of the first and second protrusions of which the projection images are line-shaped is hereinafter referred to as a third longitudinal direction. A direction perpendicular to the third longitudinal direction is referred to as a third lateral direction. In this case, the maximum width of the adjacent two of the first protrusions is the maximum of the width of the projection images of the adjacent two of the first protrusions on the first surface in the third lateral direction. Furthermore, the maximum width of the adjacent two of the second protrusions is the maximum of the width of the projection images of the adjacent two of the second protrusions on the second surface in the third lateral direction. That is, a larger one of the maximum widths of the respective projection images of the adjacent two of the first or second protrusions in the third lateral direction is set to the maximum width of the adjacent two of the first or second protrusions. The state that the third longitudinal directions of the first or second protrusions are arranged substantially in parallel means that the third longitudinal directions of the first or second protrusions are parallel to each other or that the acute angle formed by the third longitudinal directions of the first or second protrusions is 30° or less. A longitudinal direction of a projection image formed by projecting each first or second protrusion onto the first or second surface, respectively, in the thickness direction of the negative electrode current collector is set to the third longitudinal direction of the first or second protrusion.

Suppose that the projection images of the first protrusions on the first surface each have the fixed-width line shape and the longitudinal directions of the first protrusions are arranged substantially in parallel at equal intervals. The width of each first protrusion is represented by $W1t$. The center-to-center distance between the adjacent two of the first protrusions is represented by $W1s$. The center-to-center distance between protrusions is hereinafter referred to as the "interval between protrusions" in some cases. When the number of the first protrusions is sufficiently large, the ratio $A_{1X}/A_1$ of the total area $A_{1X}$ of the first protrusions to the area $A_1$ of the first surface can be approximately expressed as $W1t/W1s$. Likewise, suppose that the projection images of the second protrusions each have the fixed-width line shape and the longitudinal directions of the second protrusions are arranged substantially in parallel at equal intervals. The width of each second protrusion is represented by $W2t$. The center-to-center distance between the adjacent two of the second protrusions is represented by $W2s$. When the number of the second protrusions is sufficiently large, the ratio $A_{2X}/A_2$ of the total area $A_{2X}$ of the second protrusions to the area $A_2$ of the second surface can be approximately expressed as $W2t/W2s$.

Thus, adjusting the widths of the first and second protrusions and the clearance between the adjacent two of the first and the clearance between the adjacent two of the second protrusions such that $W1t/W1s > W2t/W2s$ is satisfied enables the total area $A_{1X}$ of the first protrusions and the total area $A_{2X}$ of the second protrusions to readily satisfy the above condition ($A_{1X}/A_1 > A_{2X}/A_2$). This allows the charge-discharge reaction to proceed homogeneously and allows cycle characteristics to be enhanced. Incidentally, the center-to-center distance can be determined as described below. That is, the lateral midpoints of two longitudinal ends of the line-shaped projection image of each protrusion are joined, whereby a center line is determined. In two neighboring protrusions, the distance between center lines is set to the center-to-center distance.

The first surface and/or the second surface may be provided with no frame-shaped continuous protrusion surrounding a region or the whole of the first or second surface such that the nonaqueous electrolyte is likely to penetrate the inside of the electrode group. The first surface and/or the second surface may have a peripheral section provided with no frame-shaped continuous protrusion surrounding most of the first or second surface. When no frame-shaped continuous protrusion is placed, the nonaqueous electrolyte is likely to penetrate the inside of a portion provided with no protrusion and the separator is likely to be in contact with deposited lithium metal. Thus, the effect of reducing the nonuniform deposition of lithium metal in the nonaqueous electrolyte is enhanced; hence, the formation of dendrites can be reduced and the deterioration of the charge-discharge efficiency can be reduced.

The first surface and/or the second surface may be provided with a band-shaped region provided with no protrusion along the first longitudinal direction or the first lateral direction. The first surface and/or the second surface may have at least one band-shaped region or two or more band-shaped regions. In this case, the nonaqueous electrolyte is likely to pass through at least one band-shaped region to penetrate the inside of the electrode group. Since the nonaqueous electrolyte can be readily held between the positive electrode and the negative electrode, the deposition and dissolution of lithium metal proceed smoothly and the deterioration of the capacity and the deterioration of the charge-discharge efficiency can be reduced. In the band-shaped region, the separator is likely to be in contact with deposited lithium metal. This enhances the effect of reducing the nonuniform deposition of lithium metal in the nonaqueous electrolyte, thereby enabling the formation of dendrites to be reduced.

The band-shaped region may be placed along the first longitudinal direction or the first lateral direction. In the negative electrode current collector, the first surface and/or the second surface may have both of a band-shaped region along one of the first longitudinal direction and the first lateral direction and a band-shaped region along the other. From the viewpoint that the nonaqueous electrolyte is more likely to penetrate the inside of the electrode group and that high capacity and high charge-discharge efficiency are likely to be ensured, a band-shaped region may be placed along the first longitudinal direction. When each surface of the negative electrode is provided with protrusions of which projection images on the surface of the negative electrode are strip-shaped or line-shaped, a band-shaped region is likely to be formed. In particular, when protrusions are placed such that the third longitudinal direction of each protrusion is substantially parallel to the first longitudinal direction, a band-shaped region is likely to be formed between two of the protrusions neighboring in the first lateral direction.

The negative electrode current collector may be provided with a region not provided with the first protrusions and/or the second protrusions on the innermost circumference side and/or outermost circumference side of winding as required. That is, the negative electrode current collector may be provided with a region not provided with the first protrusions and/or the second protrusions in a portion closest to the winding axis of the electrode group and/or a portion farthest from the winding axis of the electrode group. A negative electrode lead for electrical connection to the negative electrode may be connected to a portion provided with no protrusion in the first surface or second surface of the negative electrode current collector by, for example, welding or the like.

Figure 1B:
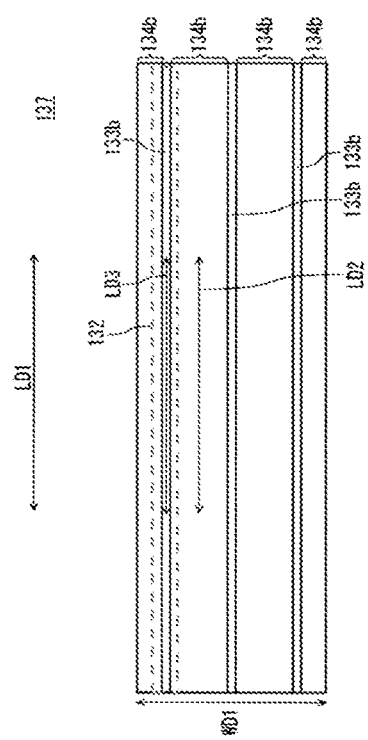
FIG. 1B is a schematic plan view of the negative electrode shown in FIG. 1A and is also an outline view of the negative electrode viewed from a second surface of the negative electrode current collector (that is, the back of the first surface)

FIGS. 1A and 1B are schematic plan views of a negative electrode 137 used in a lithium secondary battery according to an embodiment of the present disclosure. FIG. 1A illustrates the appearance of the negative electrode 137 viewed from a first surface. FIG. 1B illustrates the appearance of the negative electrode 137 viewed from a second surface. The negative electrode 137 has such a rectangular shape that the length in a direction perpendicular to the winding axis of an electrode group formed by winding is greater than the length in a direction parallel to the winding axis when a surface of the negative electrode 137 is viewed from the normal direction. Referring to FIGS. 1A and 1B, in a surface of the negative electrode 137, the direction perpendicular to the winding axis is expressed as a first longitudinal direction LD1 and the direction parallel to the winding axis is expressed as a first lateral direction WD1.

Referring to FIG. 1A, the negative electrode 137 includes metal foil 132 which is an example of a negative electrode current collector. First protrusions 133a are placed on a surface of the metal foil 132 so as to protrude from the surface of the metal foil 132. Projection images obtained by projecting the first protrusions 133a onto a surface of the metal foil 132 in a thickness direction of the metal foil 132 have the same line shape, which is denoted in the dotted frame of FIG. 1A, as the plan-view shape of the first protrusions 133a as shown in FIG. 1A.

Referring to FIG. 1A, the first protrusions 133a are placed on a first surface of the metal foil 132 such that a third longitudinal direction LD3 of each first protrusion 133a is parallel to the first longitudinal direction LD1. The first surface of the metal foil 132 is provided with band-shaped regions 134a not provided with the first protrusions 133a along the first longitudinal direction LD1. A second longitudinal direction LD2 of each band-shaped region 134a is parallel to the first longitudinal direction LD1. The minimum clearance between adjacent two of the first protrusions 133a, which is the width of the band-shaped region 134a, is greater than the maximum width of the adjacent two of the first protrusions 133a. While the first protrusions 133a may include a portion not facing a positive electrode active material, such a portion is relatively small and is therefore negligible. Thus, referring to FIG. 1A, the sum of the areas of the bases of the first protrusions 133a is substantially equivalent to the total area $A_{1X}$ of the first protrusions 133a. Referring to FIG. 1A, the sum of the areas of the bases of the first protrusions 133a and the areas of the band-shaped regions 134a is substantially equivalent to the area $A_1$ of the first surface.

Referring to FIG. 1B, the negative electrode 137 includes second protrusions 133b protruding from a surface of the metal foil 132. Projection images obtained by projecting the second protrusions 133b onto a surface of the metal foil 132 in the thickness direction of the metal foil 132 have the same line shape, which is denoted in the dotted frame of FIG. 1B, as the plan-view shape of the second protrusions 133b as shown in FIG. 1B.

Referring to FIG. 1B, the second protrusions 133b are placed on a second surface of the metal foil 132 such that a third longitudinal direction LD3 of each second protrusion 133b is parallel to the first longitudinal direction LD1. The second surface of the metal foil 132 is provided with band-shaped regions 134b not provided with the second protrusions 133b along the first longitudinal direction LD1. A second longitudinal direction LD2 of each band-shaped region 134b is parallel to the first longitudinal direction LD1. The minimum clearance between adjacent two of the second protrusions 133b, which is the width of the band-shaped region 134b, is greater than the maximum width of the adjacent two of the second protrusions 133b. While the second protrusions 133b may include a portion not facing the positive electrode active material, such a portion is relatively small and is therefore negligible. Thus, referring to FIG. 1B, the sum of the areas of the bases of the second protrusions 133b is substantially equivalent to the total area $A_{2X}$ of the second protrusions 133b. Referring to FIG. 1B, the sum of the areas of the bases of the second protrusions 133b and the areas of the band-shaped regions 134b is substantially equivalent to the area $A_2$ of the second surface.

Referring to FIGS. 1A and 1B, the width of the second protrusions 133b is substantially the same as the width of the first protrusions 133a. However, the clearance between the adjacent two of the second protrusions 133b is greater than the clearance between the adjacent two of the first protrusions 133a. Thus, the ratio $A_{1X}/A_1$ of the total area $A_{1X}$ of the first protrusions 133a to the area $A_1$ of the first surface is greater than the ratio $A_{2X}/A_2$ of the total area $A_{2X}$ of the second protrusions 133b to the area $A_2$ of the second surface. The average height $h_2$ of the second protrusions 133b is substantially the same as the average height $h_1$ of the first protrusions 133a.

A wound electrode group is formed using the negative electrode 137. In particular, the wound electrode group is formed in such a manner that the negative electrode 137, a separator, a positive electrode, and another separator are stacked and are wound from an end in the first longitudinal direction LD1 such that the first surface faces the outside and the second surface faces the inside. Using the wound electrode group in the lithium secondary battery allows a space to be formed between the adjacent two of the first protrusions 133a and between the metal foil 132 and the separator and allows a space to be formed between the adjacent two of the second protrusions 133b and between the metal foil 132 and the other separator. Lithium metal deposited by charge is stored in the spaces and therefore the expansion of the negative electrode 137 is reduced. In the wound electrode group, the first surface is located outside and the second surface is located inside. In the wound electrode group, lithium metal deposited in spaces between the first protrusions 133a is more compressed than lithium metal deposited in spaces between the second protrusions 133b and is likely to be reduced in volume. Therefore, the increase in volume of the negative electrode 137 can be effectively absorbed in such a manner that a space between the adjacent two of the second protrusions 133b is set to be greater than a space between the adjacent two of the first protrusions 133a.

For example, one or more features such as projection shapes of the first and second protrusions 133a and 133b, the number thereof, directions thereof, the width thereof, the clearance between the adjacent two of the first protrusions 133a, and the clearance between the adjacent two of the second protrusions 133b are not limited to those shown in FIGS. 1A and 1B and can be modified (e.g., as described below).

The negative electrode 137 may include, for example, an electrically conductive sheet like the metal foil 132. The negative electrode 137 may include the first protrusions 133a and the second protrusions 133b such that the first protrusions 133a and the second protrusions 133b are placed on the electrically conductive sheet. Alternatively, in the case where negative electrode active material layers are formed on the electrically conductive sheet, the negative electrode 137 may include the first protrusions 133a and the second protrusions 133b such that the first protrusions 133a and the second protrusions 133b are placed on the respective negative electrode active material layers.

The electrically conductive sheet is made of, for example, an electrically conductive material other than lithium metal and a lithium alloy. The electrically conductive material may be a metal material such as metal or an alloy. The metal material may be material unreactive with lithium. Such material includes material unreactive with lithium metal and/or lithium ions and, in particular, may be material that does not form any alloy or intermetallic compound with lithium. Examples of the metal material include copper (Cu), nickel (Ni), and iron (Fe) and also include alloys containing these metal elements. An alloy used may be a copper alloy, stainless steel (SUS), or the like. From the viewpoint that high capacity and high charge-discharge efficiency are likely to be ensured, the metal material may be copper and/or a copper alloy because copper and the copper alloy have high electrical conductivity. The electrically conductive sheet may contain one or more of these electrically conductive materials.

The electrically conductive sheet used is foil, a film, or the like. The electrically conductive sheet may be porous unless the windability thereof is impaired. From the viewpoint that high charge-discharge efficiency is likely to be ensured, the electrically conductive sheet may be the metal foil 132 and the metal foil 132 may contain copper. The metal foil 132 may be copper foil or copper alloy foil. The content of copper in the metal foil 132 may be 50% by mass or more or 80% by mass or more. In particular, the metal foil 132 may be copper foil containing substantially only copper as a metal element.

The electrically conductive sheet may have a smooth surface. The term "smooth" means that the maximum height roughness Rz of the surface is 20 μm or less. The maximum height roughness Rz may be 10 μm or less. The maximum height roughness Rz is measured in accordance with JIS B 0601:2013. Examples of the electrically conductive sheet, which has such maximum height roughness Rz, include foil of the above metal material and a graphite sheet. The graphite sheet used may be one in which basal planes are preferentially exposed. For example, in at least one surface of the electrically conductive sheet that faces the positive electrode active material (that is, the first surface and/or the second surface), the maximum height roughness Rz satisfies the above condition.

The thickness of the electrically conductive sheet is not particularly limited and may be, for example, 5 μm to 20 μm. At least one of the surfaces of the electrically conductive sheet (that is, the first surface and/or the second surface) may be provided with the negative electrode active material layers separately from the first protrusions 133a and/or the second protrusions 133b. The negative electrode active material layers contain lithium metal. In this case, the negative electrode active material layers may be included in a negative electrode current collector according to the present disclosure. This allows the charge-discharge efficiency to be likely to be increased. Each negative electrode active material layer may be placed over a region of the electrically conductive sheet surface that faces the positive electrode active material. The negative electrode active material layer is formed by, for example, the electrodeposition or vapor deposition of lithium metal. The order of forming the negative electrode active material layer and the first protrusions 133a or the second protrusions 133b is not particularly limited. After the negative electrode active material layer is formed, the first protrusions 133a or the second protrusions 133b may be formed. Alternatively, after the first protrusions 133a or the second protrusions 133b are formed, the negative electrode active material layer may be formed. The thickness of the negative electrode active material layer is not particularly limited and may be, for example, 1 μm to 150 μm.

Examples of a negative electrode active material contained in the negative electrode active material layer include lithium metal, a lithium alloy, and material reversibly storing and releasing lithium ions. The negative electrode active material used may be one for use in lithium ion batteries. Examples of the lithium alloy include lithium-aluminium alloys. Examples of the material reversibly storing and releasing lithium ions include a carbon material and an alloying material. The carbon material is, for example, at least one selected from the group consisting of graphite materials, soft carbon, hard carbon, and amorphous carbon. The alloying material is, for example, material containing silicon and/or tin. The alloying material is, for example, at least one selected from the group consisting of silicon, a silicon alloy, a silicon compound, tin, a tin alloy, and a tin compound. Each of the silicon compound and the tin compound is an oxide, a nitride, and/or the like.

The negative electrode active material layer may be formed in such a manner that the negative electrode active material is deposited on a surface of the negative electrode current collector by a vapor-phase process such as electrodeposition or vapor deposition. Alternatively, the negative electrode active material layer may be formed in such a manner that a negative electrode mixture which contains the negative electrode active material and a binding material and which contains one or more other components as required is applied to a surface of the negative electrode current collector. The one or more other components are at least one selected from the group consisting of an electrically conductive agent, a thickening agent, and an additive.

Material making up the first and second protrusions 133a and 133b is not particularly limited. The first and second protrusions 133a and 133b may be made of an electrically conductive material and/or an insulating material. The electrically conductive material may be selected from those exemplified for the electrically conductive sheet. The negative electrode 137 provided with the first and second protrusions 133a and 133b can be obtained in such a manner that protrusions are formed on a surface of the electrically conductive sheet by, for example, pressing. The first and second protrusions 133a and 133b may be formed in such a manner that paint containing the electrically conductive material is applied to a surface of the electrically conductive sheet or tape made of the electrically conductive material is attached to the electrically conductive sheet.

The first and second protrusions 133a and 133b may be made of a resin material. The resin material may be an insulating material. When the first and second protrusions 133a and 133b are made of the insulating material, such as the resin material, the deposition of lithium metal on the tips of the first and second protrusions 133a and 133b by charge is reduced. Deposited lithium metal is stored in spaces formed in the vicinity of a surface of the negative electrode current collector, particularly the electrically conductive sheet, such as the metal foil 132. Therefore, the effect of reducing the expansion of the negative electrode 137 can be enhanced.

The resin material is, for example, at least one selected from the group consisting of an olefin resin, an acrylic resin, a polyamide resin, a polyimide resin, and a silicone resin. The resin material used may be a cured product of a curable resin such as an epoxy resin. The first and second protrusions 133a and 133b can be formed in such a manner that, for example, adhesive tape made of resin is attached to a surface of the negative electrode current collector (for example, the metal foil 132). Alternatively, the first and second protrusions 133a and 133b may be formed in such a manner that a solution or dispersion containing the resin material is applied to a surface of the negative electrode current collector and is dried. The first and second protrusions 133a and 133b can also be formed in such a manner that the curable resin is applied to a surface of the negative electrode current collector so as to form a desired shape and is cured.

Lithium Secondary Battery

The configuration of a lithium secondary battery is described below in detail. The lithium secondary battery includes a wound electrode group and a nonaqueous electrolyte. The wound electrode group is formed by winding a positive electrode, a negative electrode, and a separator disposed therebetween.

Figure 2:
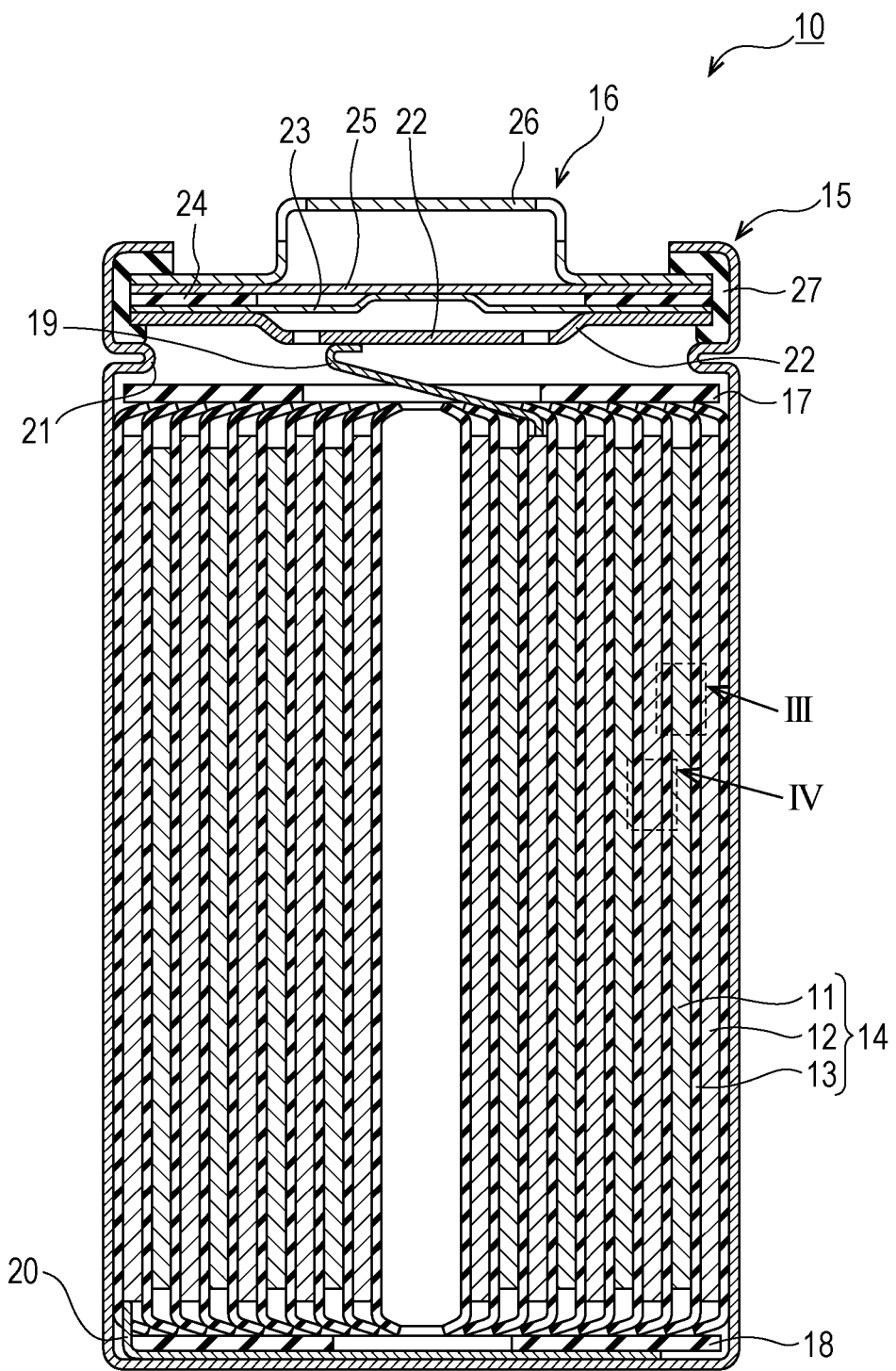
FIG. 2 is a schematic vertical sectional view of a lithium secondary battery according to another embodiment of the present disclosure.
Figure 3:
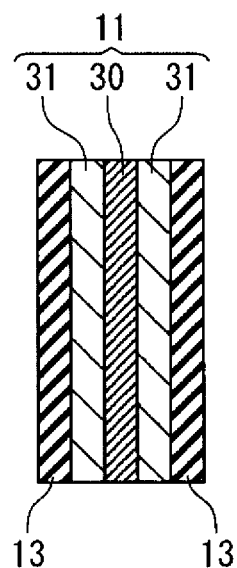
FIG. 3 is a schematic enlarged sectional view of a region indicated by III in FIG. 2.
Figure 4:
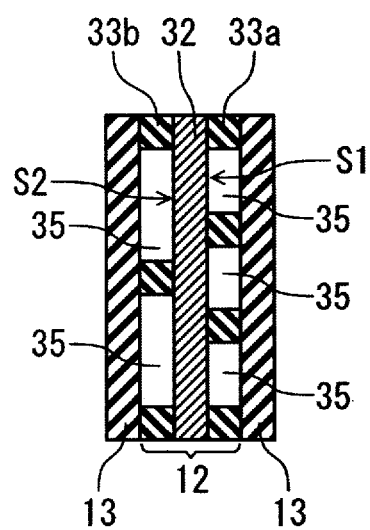
FIG. 4 is a schematic enlarged sectional view of a region indicated by IV in FIG. 2.

FIG. 2 is a schematic vertical sectional view of a lithium secondary battery 10 according to an embodiment of the present disclosure. FIG. 3 is a schematic enlarged sectional view of a region indicated by III in FIG. 2. FIG. 4 is a schematic enlarged sectional view of a region indicated by IV in FIG. 2. Incidentally, FIG. 4 illustrates a cross section in a fully discharged state. The term "the fully discharged state of a lithium secondary battery" as used herein refers to a state in which a battery has been discharged to a state of charge (SOC) of 0.05×C or less, where C is the rated capacity of the battery. For example, when the battery has been discharged to a lower limit voltage at a constant current of, for example, 0.05 C, the state is the fully discharged state of a lithium secondary battery. The lower limit voltage is, for example, 2.5 V.

The lithium secondary battery 10 includes a battery case which is cylindrical, a winding type of electrode group 14 housed in the battery case, and a nonaqueous electrolyte, which is not shown, and is a cylindrical battery. The battery case is composed of a case body 15 which is a metal container with a bottomed cylindrical shape and a sealing body 16 sealing an opening of the case body 15. A gasket 27 is placed between the case body 15 and the sealing body 16, whereby the airtightness of the battery case is ensured. In the case body 15, each of insulating plates 17 and 18 is placed on a corresponding one of both end portions of the electrode group 14 in a winding axis direction. The case body 15 includes, for example, a stepped section 21 formed by partly pressing a side wall of the case body 15 from outside. The stepped section 21 may extend along the side wall of the case body 15 in a circumferential direction of the case body 15. In this case, the sealing body 16 is supported with a surface of the stepped section 21 that is located on the opening side.

The sealing body 16 includes a filter 22, a lower valve 23, an insulating member 24, an upper valve 25, and a cap 26. In the sealing body 16, these members are stacked in that order. The sealing body 16 is fitted to the opening of the case body 15 such that the cap 26 is located outside the case body 15 and the filter 22 is located inside the case body 15. The members included in the sealing body 16 have, for example, a disk shape or a ring shape. A central portion of the lower valve 23 and a central portion of the upper valve 25 are connected to each other. The insulating member 24 is disposed between a peripheral portion of the lower valve 23 and a peripheral portion of the upper valve 25. A peripheral portion of the filter 22 and the peripheral portion of the lower valve 23 are connected to each other. The peripheral portion of the upper valve 25 and a peripheral portion of the cap 26 are connected to each other. That is, the members other than the insulating member 24 are electrically connected to each other.

The lower valve 23 has a vent, which is not shown. Therefore, when the pressure in the battery case is increased by abnormal heat generation or the like, the upper valve 25 swells toward the cap 26 to separate from the lower valve 23. This breaks the electrical connection between the lower valve 23 and the upper valve 25. When the pressure in the battery case is further increased, the upper valve 25 ruptures and gas is discharged from an opening, which is not shown, formed in the cap 26.

The electrode group 14 includes a positive electrode 11, a negative electrode 12, and a separator 13. The positive electrode 11, the negative electrode 12, and the separator 13 are strip-shaped. The positive electrode 11 and the negative electrode 12 are spirally wound with the separator 13 therebetween such that a lateral direction of the positive and negative electrodes 11 and 12, which are strip-shaped, is parallel to the winding axis of the electrode group 14. In a cross section perpendicular to the winding axis of the electrode group 14, the positive electrode 11 and the negative electrode 12 are alternately stacked in a radial direction of the electrode group 14 with the separator 13 therebetween.

The positive electrode 11 is electrically connected to the cap 26 through a positive electrode lead 19. The cap 26 doubles as a positive electrode terminal. One end portion of the positive electrode lead 19 is connected to, for example, the vicinity of the longitudinal center of the positive electrode 11. The positive electrode lead 19 extends from the positive electrode 11 to the filter 22 through a through-hole, which is not shown, formed in the insulating plate 17. The other end portion of the positive electrode lead 19 is welded to a surface of the filter 22 that is located on the electrode group 14 side.

The negative electrode 12 is electrically connected to the case body 15 through a negative electrode lead 20. The case body 15 doubles as a negative electrode terminal. One end portion of the negative electrode lead 20 is connected to, for example, a longitudinal end portion of the negative electrode 12 and the other end portion thereof is welded to the inside bottom surface of the case body 15.

FIG. 3 illustrates the positive electrode 11, which faces the separator 13. FIG. 4 illustrates the negative electrode 12, which faces the separator 13. The positive electrode 11 includes a positive electrode current collector 30 and positive electrode mixture layers 31 placed on both surfaces of the positive electrode current collector 30. The negative electrode 12 includes a negative electrode current collector 32, first protrusions 33a placed on a first surface S1 that is the outside of the negative electrode current collector 32, and second protrusions 33b placed on a second surface S2 that is the inside of the negative electrode current collector 32. The first surface S1 and second surface S2 of the negative electrode current collector 32 are the first surface and second surface, respectively, of the electrically conductive sheet, such as metal foil. The first protrusions 33a protrude from the first surface S1 toward a surface of the separator 13 that faces the first surface S1. The second protrusions 33b protrude from the second surface S2 toward a surface of the separator 13 that faces the second surface S2.

The first surface S1 and the second surface S2 are provided with the first protrusions 33a and the second protrusions 33b, respectively. A space 35 is formed between adjacent two of the first protrusions 33a and between the first surface S1 and the separator 13. Furthermore, another space 35 is formed between adjacent two of the second protrusions 33b and between the second surface S2 and the separator 13. In the lithium secondary battery 10, lithium metal is deposited in the spaces 35 by charge and deposited lithium metal is dissolved in the nonaqueous electrolyte by discharge. Since deposited lithium metal can be stored in the spaces 35, the change in apparent volume of the negative electrode 12 due to the deposition of lithium metal can be reduced.

Lithium metal deposited between the second protrusions 33b on the second surface S2 side has lower density and a larger volume as compared to lithium metal deposited between the first protrusions 33a on the first surface S1 side. Therefore, the interval between the adjacent two of the second protrusions 33b on the second surface S2 side is set to be greater than the interval between the adjacent two of the first protrusions 33a on the first surface S1 side such that the spaces 35 which are located on the second surface S2 side in which lithium metal is deposited are larger than those located on the first surface S1 side, thereby enabling the change in volume of the negative electrode 12 to be absorbed. Thus, the expansion of the negative electrode 12 can be reduced. In the electrode group 14, a pressure is applied to lithium metal stored in the spaces 35 and therefore the separation of lithium metal is reduced. Thus, the deterioration of the charge-discharge efficiency can be reduced.

The negative electrode 137, which includes the above-mentioned first and second protrusions 133a and 133b and negative electrode current collector (for example, the metal foil 132), can be used instead of the negative electrode 12, which includes the first and second protrusions 33a and 33b and the negative electrode current collector 32. Thus, for the first and second protrusions 33a and 33b, the negative electrode 12, and the negative electrode current collector 32, the description of the above-mentioned first and second protrusions 133a and 133b, the negative electrode 137, and the negative electrode current collector (for example, the metal foil 132) can be referenced. Components of the lithium secondary battery that exclude the negative electrode 12 are further described below in detail.

Positive Electrode 11

The positive electrode 11 includes, for example, the positive electrode current collector 30 and the positive electrode mixture layers 31, which are placed on the positive electrode current collector 30. The positive electrode mixture layers 31 may be placed on both surfaces of the positive electrode current collector 30. The positive electrode mixture layers 31 may be placed on one surface of the positive electrode current collector 30. For example, in a region connected to the positive electrode lead 19 and/or a region not facing the negative electrode 12, the positive electrode mixture layers 31 may be placed only on one surface of the positive electrode current collector 30. For example, the innermost circumference of winding, a region located in the vicinity thereof have a domain not facing the negative electrode 12 and/or the outermost circumference of winding and a region located in the vicinity thereof have a domain not facing the negative electrode 12 in some cases. Therefore, in such domains, the positive electrode mixture layers 31 may be placed only on one surface of the positive electrode current collector 30 or need not be placed on both surfaces of the positive electrode current collector 30.

The positive electrode mixture layers 31 contain a positive electrode active material and may contain an electrically conductive material and/or a binding material in the form of an arbitrary component. The positive electrode mixture layers 31 may contain an additive as required. An electrically conductive carbon material may be placed between the positive electrode current collector 30 and the positive electrode mixture layers 31. The positive electrode 11 is obtained in such a manner that, for example, slurry containing components of the positive electrode mixture layers 31 and a dispersion medium is applied to a surface of the positive electrode current collector 30 and a wet coating is dried, followed by rolling. The electrically conductive carbon material may be applied to a surface of the positive electrode current collector 30 as required. The dispersion medium is water, an organic medium, and/or the like.

The positive electrode active material is, for example, material storing and releasing lithium ions. The positive electrode active material is, for example, at least one selected from the group consisting of a lithium transition metal oxide, a transition metal fluoride, a polyanion, a fluorinated polyanion, and a transition metal sulfide. The positive electrode active material may be the lithium transition metal oxide because the lithium transition metal oxide has high average discharge voltage and is advantageous in terms of cost.

Examples of a transition metal element contained in the lithium transition metal oxide include Sc, Ti, V, Cr, Mn, Fe, Co, Ni, Cu, Y, Zr, and W. The lithium transition metal oxide may contain one or more types of transition metal elements. The transition metal element may be at least one selected from the group consisting of Co, Ni, and Mn. The lithium transition metal oxide may contain one or more types of typical metal elements as required. Examples of a typical metal element include Mg, Al, Ca, Zn, Ga, Ge, Sn, Sb, Pb, and Bi. The typical metal element may be Al or the like.

The electrically conductive material is, for example, a carbon material. Examples of the carbon material include carbon black, acetylene black, Ketjenblack, carbon nanotubes, and graphite. The positive electrode mixture layers 31 may contain one or more types of electrically conductive materials. The electrically conductive carbon material, which may be present between the positive electrode current collector 30 and the positive electrode mixture layers 31, may be at least one selected from these carbon materials.

Examples of the binding material include a fluorocarbon resin, polyacrylonitrile, a polyamide resin, an acrylic resin, a polyolefin resin, and a rubber-like polymer. Examples of the fluorocarbon resin include polytetrafluoroethylene and polyvinylidene fluoride. The positive electrode mixture layers 31 may contain one or more types of binding materials.

Examples of material of the positive electrode current collector 30 include metal materials containing Al, Ti, Fe, or the like. The metal materials may be Al, an Al alloy, Ti, a Ti alloy, and an Fe alloy. The Fe alloy may be SUS. The positive electrode current collector 30 is foil, a film, or the like. The positive electrode current collector 30 may be porous. The positive electrode current collector 30 used may be, for example, metal mesh or the like. The positive electrode current collector 30 may be surface-coated with a carbon material such as carbon. This enables the reduction of resistance, the impartment of catalysis, the increase in bonding between the positive electrode mixture layers 31 and the positive electrode current collector 30, and the like to be expected.

Separator 13

The separator 13 used is a porous sheet having ionic permeability and insulating properties. Examples of the porous sheet include a microporous film, a woven fabric, and a nonwoven fabric. Material of the separator 13 is not particularly limited and may be a polymeric material. Examples of the polymeric material include an olefin resin, a polyamide resin, and cellulose. Examples of the olefin resin include polyethylene, polypropylene, and a copolymer of ethylene and propylene. The separator 13 may contain an additive as required. The additive is an inorganic filler or the like.

The separator 13 may include a plurality of layers different in morphology and/or composition. The separator 13 may be, for example, a multilayer body composed of a microporous film of polyethylene and a microporous film of polypropylene or a multilayer body composed of a nonwoven fabric including cellulose fibers and a nonwoven fabric including thermoplastic resin fibers. The separator 13 may be one obtained by forming a coating of a polyamide resin on a surface of a microporous film, a woven fabric, or a nonwoven fabric. The separator 13 has high durability even if a pressure is applied to the separator 13 in such a state that the separator 13 is in contact with protrusions. From the viewpoint of ensuring heat resistance and/or strength, the separator 13 may include an inorganic filler-containing layer on the side facing the positive electrode 11 and/or an inorganic filler-containing layer on the side facing the negative electrode 12.

Nonaqueous Electrolyte

The nonaqueous electrolyte used is one having lithium ion conductivity. The nonaqueous electrolyte contains a nonaqueous solvent and also contains lithium ions and anions dissolved in the nonaqueous solvent. The nonaqueous electrolyte may be liquid or gelatinous. Alternatively, the nonaqueous electrolyte may be a solid electrolyte.

When the nonaqueous electrolyte is liquid, the nonaqueous electrolyte is prepared by dissolving a lithium salt in the nonaqueous solvent. Though the lithium ions and the anions are formed by dissolving the lithium salt in the nonaqueous solvent, the undissociated lithium salt may be contained in the nonaqueous electrolyte. The lithium salt used is a salt of the lithium ions and the anions.

When the nonaqueous electrolyte is gelatinous, the nonaqueous electrolyte contains a liquid electrolyte and a matrix polymer. The matrix polymer used is, for example, a polymeric material that absorbs the nonaqueous electrolyte to gel. The polymeric material is at least one selected from the group consisting of a fluorocarbon resin, an acrylic resin, and a polyether resin.

The lithium salt or anions used may be those used in known nonaqueous electrolytes for lithium secondary batteries. Examples of the anions include $BF_4^-$ ions, $ClO_4^-$ ions, $PF_6^-$ ions, $CF_3SO_3^-$ ions, $CF_3CO_2^-$ ions, anions of imides, and anions of oxalate complexes. Examples of the imide anions include $N(SO_2CF_3)_2^-$ ions and $N(C_mF_{2m+1}SO_2)_x(C_nF_{2n+1}SO_2)_y^-$ ions, where m and n are independently 0 or an integer of 1 or more and x and y are independently 0, 1, or 2 and satisfy the equation x+y=2. The oxalate complex anions may contain boron and/or phosphorus. Examples of the oxalate complex anions include bis(oxalato)borate anions, $BF_2(C_2O_4)^-$ ions, $PF_4(C_2O_4)^-$ ions, and $PF_2(C_2O_4)_2^-$ ions. The nonaqueous electrolyte may contain one or more types of these anions.

From the viewpoint of reducing the dendritic deposition of lithium metal, the nonaqueous electrolyte may contain at least one selected from the group consisting of the $PF_6^-$ ions, the imide anions, and the oxalate complex anions. The imide anions may be $N(SO_2CF_3)_2^-$ ions, $N(SO_2C_2F_5)_2^-$ ions, or $N(SO_2F)_2^-$ ions. In particular, in the case of using the nonaqueous electrolyte containing the oxalate complex anions, lithium metal is likely to be uniformly deposited in the form of fine particles because of the interaction of the oxalate complex anions with lithium. Therefore, the uneven expansion of the negative electrode 12 due to the local deposition of lithium metal can be reduced. The oxalate complex anions may be combined with other anions. The other anions may be the $PF_6^-$ ions and/or the imide anions.

Examples of the nonaqueous solvent include esters, ethers, nitriles, and hydrogen-substituted compounds thereof. The nonaqueous electrolyte may contain one or more of these nonaqueous solvents. The hydrogen-substituted compounds are fluorides or the like.

Examples of the esters include cyclic carbonates, linear carbonates, cyclic carboxylates, and linear carboxylates. Examples of the cyclic carbonates include ethylene carbonate, propylene carbonate, and fluoroethylene carbonate (FEC). Examples of the linear carbonates include dimethyl carbonate, ethyl methyl carbonate, diethyl carbonate, methyl propyl carbonate, ethyl propyl carbonate, and methyl isopropyl carbonate. Examples of the cyclic carboxylates include γ-butyrolactone and γ-valerolactone. Examples of the linear carboxylates include methyl acetate, ethyl acetate, propyl acetate, methyl propionate, ethyl fluoropropionate, and methyl fluoropropionate.

Examples of the ethers include cyclic ethers and linear ethers. Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers. Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The concentration of the lithium salt in the nonaqueous electrolyte is, for example, 0.5 mol/L to 3.5 mol/L. Herein, the concentration of the lithium salt is the sum of the concentration of the dissociated lithium salt and the concentration of the undissociated lithium salt. The concentration of the anions in the nonaqueous electrolyte may be 0.5 mol/L to 3.5 mol/L.

The nonaqueous electrolyte may contain an additive. The additive may be one forming a coating on the negative electrode 12. The formation of dendrites on the negative electrode 12 is likely to be reduced by forming a coating derived from the additive on the negative electrode 12. Examples of the additive include vinylene carbonate, FEC, and vinyl ethyl carbonate (VEC). The additive may be used alone or in combination with one or more additives.

Others

In an illustrated example, a cylindrical lithium secondary battery has been described. This embodiment is not limited to this case and can be applied to a lithium secondary battery including such a wound electrode group that the shape of an end surface of the wound electrode group in a winding axis direction is oval or elliptic. For components of a lithium secondary battery that exclude an electrode group and a nonaqueous electrolyte, those known can be used without particular limitations.

EXAMPLES

A lithium secondary battery according to the present disclosure is described below in detail with reference to examples and comparative examples. The present disclosure is not limited to the examples.

Example 1

(1) Preparation of Positive Electrode

A positive electrode active material, acetylene black serving as an electrically conductive material, and polyvinylidene fluoride serving as a binding material were mixed at a mass ratio of 95:2.5:2.5. An appropriate amount of N-methyl-2-pyrrolidone serving as a dispersion medium was added to the mixture, followed by mixing, whereby positive electrode mixture slurry was prepared. The positive electrode active material used was a lithium transition metal oxide containing Ni, Co, and Al.

The positive electrode mixture slurry was applied to both surfaces of aluminium foil serving as a positive electrode current collector, followed by drying. The dry matter was compressed using a roller, whereby a multilayer body was obtained. The multilayer body was cut to a predetermined electrode size, whereby a positive electrode including the positive electrode current collector and positive electrode mixture layers placed on both surfaces of the positive electrode current collector was prepared. An exposed portion of the positive electrode current collector that was covered by none of the positive electrode mixture layers was formed in a region of the positive electrode. An end portion of a positive electrode lead made of aluminium was welded to the exposed portion of the positive electrode current collector.

(2) Preparation of Negative Electrode

A negative electrode 137 was prepared so as to have a first surface having first protrusions 133a as shown in FIG. 1A and a second surface having second protrusions 133b as shown in FIG. 1B. In particular, electrolytic copper foil with a thickness of 10 µm was used as metal foil 132 that was an example of a negative electrode current collector; adhesive tape, made of polyethylene, having a thickness of 35 µm and a width of 1 mm was attached to each surface of the electrolytic copper foil so as to be parallel to a longitudinal direction; and the first protrusions 133a and the second protrusions 133b were formed on the first surface and the second surface, respectively, so as to have a line shape. In this operation, the interval between the first protrusions 133a, which were formed on the first surface, was set to 6 mm and the interval between the second protrusions 133b, which were formed on the second surface, was set to 8 mm. Incidentally, the interval between the first protrusions 133a is the center-to-center distance between adjacent two of the first protrusions 133a. The interval between the second protrusions 133b is the center-to-center distance between adjacent two of the second protrusions 133b. The definition of the interval applies to other examples and comparative examples below.

In this case, the ratio $A_{1X}/A_1$ of the total area $A_{1X}$ of the first protrusions 133a (that is, the sum of the projected areas of the first protrusions 133a) to the area $A_1$ of the first surface can be regarded as $1/6 \times 100 = 16.7\%$. Likewise, the ratio $A_{2X}/A_2$ of the total area $A_{2X}$ of the second protrusions 133b (that is, the sum of the projected areas of the second protrusions 133b) to the area $A_2$ of the second surface can be regarded as $1/8 \times 100 = 12.5\%$. The average height of the first protrusions 133a from the first surface and the average height of the second protrusions 133b from the second surface were both 35 µm. An obtained one was cut to a predetermined electrode size, whereby the negative electrode 137 was obtained. An end portion of a negative electrode lead made of nickel was welded to the negative electrode 137.

(3) Preparation of Nonaqueous Electrolyte

Ethylene carbonate and dimethyl carbonate were mixed at a volume ratio of 3:7. In the mixture, $LiPF_6$ and $LiBF_2(C_2O_4)$ were dissolved such that the concentration of $LiPF_6$ was 1 mol/L and the concentration of $LiBF_2(C_2O_4)$ was 0.1 mol/L. In this manner, a liquid nonaqueous electrolyte was prepared.

(4) Preparation of Battery

In an inert gas atmosphere, the positive electrode and the negative electrode 137 were stacked in such a state that a microporous film, serving as a separator, made of polyethylene was disposed therebetween. In particular, the positive electrode, a separator, the negative electrode 137, and another separator were stacked in that order, whereby a multilayer body was obtained. This multilayer body was spirally wound, whereby an electrode group was prepared. In this operation, this multilayer body was wound such that the interval between the first protrusions 133a was 6 mm, the first surface was located outside, the interval between the second protrusions 133b was 8 mm, and the second surface was located inside. In the electrode group, almost 100% of the upper surfaces of the first protrusions 133a and almost 100% of the upper surfaces of second protrusions 133b were in contact with the separators. The electrode group was housed in a pouched enclosure formed from a laminated sheet including an Al layer and the nonaqueous electrolyte was poured into the enclosure in which the electrode group was housed, followed by sealing the enclosure. In this manner, a lithium secondary battery was prepared.

Example 2

In the preparation of a negative electrode, the interval between second protrusions 133b formed on a second surface was set to 11 mm. In the preparation of an electrode group, a multilayer body was wound such that the interval between first protrusions 133a was 6 mm, a first surface was located outside, the interval between second protrusions 133b was 11 mm, and the second surface was located inside. A lithium secondary battery was prepared in substantially the same manner as that used in Example 1 except the above.

As is the case with Example 1, the ratio $A_{1X}/A_1$ of the total area $A_{1X}$ of the first protrusions 133a to the area $A_1$ of the first surface can be regarded as $1/6 \times 100 = 16.7\%$. The ratio $A_{2X}/A_2$ of the total area $A_{2X}$ of the second protrusions 133b to the area $A_2$ of the second surface can be regarded as $1/11 \times 100 = 9.1\%$.

Example 3

In the preparation of a negative electrode, first protrusions 133a and second protrusions 133b were formed on a first surface and a second surface, respectively, using adhesive tape, made of polyethylene, having a thickness of 50 µm and a width of 1 mm. A lithium secondary battery was prepared in substantially the same manner as that used in Example 2 except the above.

The ratio $A_{1X}/A_1$ of the total area $A_{1X}$ of the first protrusions 133a to the area $A_1$ of the first surface can be regarded as $\frac{1}{6} \times 100 = 16.7\%$. The ratio $A_{2X}/A_2$ of the total area $A_{2X}$ of the second protrusions 133b to the area $A_2$ of the second surface can be regarded as $\frac{1}{11} \times 100 = 9.1\%$.

Example 4

In the preparation of a negative electrode, first protrusions 133a were formed on a first surface using adhesive tape, made of polyethylene, having a thickness of 35 µm and a width of 2 mm and second protrusions 133b were formed on a second surface adhesive tape, made of polyethylene, having a thickness of 35 µm and a width of 1 mm. In this operation, the interval between the first protrusions 133a, which were formed on the first surface, was 12 mm and the interval between second protrusions 133b, which were formed on the first surface, was 11 mm. In the preparation of an electrode group, a multilayer body was wound such that the width of the first protrusions 133a was 2 mm, the first surface was located outside, the width of the second protrusions 133b was 1 mm, and the second surface was located inside. A lithium secondary battery was prepared in substantially the same manner as that used in Example 1 except the above.

The ratio $A_{1X}/A_1$ of the total area $A_{1X}$ of the first protrusions 133a to the area $A_1$ of the first surface can be regarded as $\frac{2}{12} \times 100 = 16.7\%$. The ratio $A_{2X}/A_2$ of the total area $A_{2X}$ of the second protrusions 133b to the area $A_2$ of the second surface can be regarded as $\frac{1}{11} \times 100 = 9.1\%$.

Comparative Example 1

In the preparation of a negative electrode, first protrusions 133a and second protrusions 133b were formed on a first surface and a second surface, respectively, by attaching pieces of adhesive tape, made of polyethylene, having a thickness of 35 µm and a width of 1 mm to the first surface and the second surface at intervals of 6 mm. A lithium secondary battery was prepared in substantially the same manner as that used in Example 1 except the above.

The ratio $A_{1X}/A_1$ of the total area $A_{1X}$ of the first protrusions 133a to the area $A_1$ of the first surface and the ratio $A_{2X}/A_2$ of the total area $A_{2X}$ of the second protrusions 133b to the area $A_2$ of the second surface can both be regarded as $\frac{1}{6} \times 100 = 16.7\%$.

Comparative Example 2

A lithium secondary battery was prepared using the negative electrode current collector prepared in Example 1. In the preparation of an electrode group, a multilayer body was configured in such a manner that the front and back of a negative electrode that were provided with protrusions were reversed with respect to Example 1. That is, protrusions were formed on a first surface at intervals of 8 mm, protrusions were formed on a second surface at intervals of 6 mm, and the multilayer body was wound such that the second surface was located inside the first surface.

The ratio $A_{1X}/A_1$ of the total area $A_{1X}$ of first protrusions 133a to the area $A_1$ of the first surface can be regarded as $\frac{1}{8} \times 100 = 12.5\%$. The ratio $A_{2X}/A_2$ of the total area $A_{2X}$ of second protrusions 133b to the area $A_2$ of the second surface can be regarded as $\frac{1}{6} \times 100 = 16.7\%$.

Comparative Example 3

The negative electrode current collector prepared in Example 3 was used. In the preparation of a negative electrode, a multilayer body was configured in such a manner that the front and back of a negative electrode that were provided with protrusions were reversed with respect to Example 3. That is, protrusions were formed on a first surface at intervals of 11 mm, protrusions were formed a second surface at intervals of 6 mm, and the multilayer body was wound such that the second surface was located inside the first surface. A lithium secondary battery was prepared in substantially the same manner as that used in Example 1 except the above.

The ratio $A_{1X}/A_1$ of the total area $A_{1X}$ of first protrusions 133a to the area $A_1$ of the first surface can be regarded as $\frac{1}{11} \times 100 = 9.1\%$. The ratio $A_{2X}/A_2$ of the total area $A_{2X}$ of second protrusions 133b to the area $A_2$ of the second surface can be regarded as $\frac{1}{6} \times 100 = 16.7\%$.

Evaluation

The lithium secondary batteries prepared in Examples 1 to 4 and Comparative Examples 1 to 3 were subjected to a charge-discharge test by a procedure below and were evaluated for negative-electrode expansion coefficient. In a 25° C. thermostatic chamber, each lithium secondary battery was charged under conditions below, was then rested for 20 minutes, and was then discharged under conditions below.

Charge

Constant-current charge was performed at a current of 10 mA per unit electrode area (square centimeters) until the battery voltage reached 4.3 V. Thereafter, constant-voltage charge was performed at a voltage of 4.3 V until the current per unit electrode area (square centimeters) reached 1 mA.

Discharge

Constant-current discharge was performed at a current of 10 mA per unit electrode area (square centimeters) until the battery voltage reached 2.5 V. The above charge and discharge were set to one cycle. After the second-cycle charge was performed, the lithium secondary battery was disassembled in an inert gas atmosphere and the negative electrode was taken out of the lithium secondary battery. After the negative electrode was washed with dimethyl carbonate and was dried, the thickness of the negative electrode was measured. The thickness of the negative electrode was determined in such a manner that arbitrary five points, provided with no protrusions, in the negative electrode were measured using a Peacock digital thickness gauge, G2-205M, and the obtained measurements were averaged. The thickness of the negative electrode before charge and discharge was set to 100% and the ratio (%) of the thickness of the negative electrode after the second cycle to the thickness of the negative electrode before charge and discharge was set to the negative-electrode expansion coefficient.

The table shows results of Examples 1 to 4 and Comparative Examples 1 to 3. The table also shows the ratio $A_{1X}/A_1$ of the total area $A_{1X}$ of first protrusions to the area $A_1$ of a first surface and the ratio $A_{2X}/A_2$ of the total area $A_{2X}$ of second protrusions to the area $A_2$ of a second surface. In the table, the lithium secondary battery prepared in Example 1 is represented by A1, the lithium secondary battery prepared in Example 2 is represented by A2, the lithium secondary battery prepared in Example 3 is represented by A3, the lithium secondary battery prepared in Example 4 is represented by A4, the lithium secondary battery prepared in Comparative Example 1 is represented by B1, the lithium secondary battery prepared in Comparative Example 2 is represented by B2, and the lithium secondary battery prepared in Comparative Example 3 is represented by B3.

TABLE

|    | $A_{1X}/A_1$ (%) | $A_{2X}/A_2$ (%) | Negative-electrode expansion coefficient (%) |
|----|------|------|-----|
| A1 | 16.7 | 12.5 | 112 |
| A2 | 16.7 | 9.1  | 109 |
| A3 | 16.7 | 9.1  | 102 |
| A4 | 16.7 | 9.1  | 116 |
| B1 | 16.7 | 16.7 | 138 |
| B2 | 12.5 | 16.7 | 132 |
| B3 | 9.1  | 16.7 | 128 |

As shown in the table, the lithium secondary batteries prepared in Examples 1 to 4 have a lower negative-electrode expansion coefficient as compared to the lithium secondary batteries prepared in Comparative Examples 1 to 3.

In the lithium secondary battery prepared in each of Comparative Examples 1 to 3, the ratio $A_{1X}/A_1$ of the total area $A_{1X}$ of the first protrusions to the area $A_1$ of the first surface is less than or equal to the ratio $A_{2X}/A_2$ of the total area $A_{2X}$ of the second protrusions to the area $A_2$ of the second surface. The lithium secondary battery prepared in Comparative Example 3, in which the ratio $A_{1X}/A_1$ is the same as the ratio $A_{2X}/A_2$, has a negative-electrode expansion coefficient of 138%. When the ratio $A_{2X}/A_2$ is constant, as the ratio $A_{1X}/A_1$ decreases, the negative-electrode expansion coefficient decreases to 128%.

However, in the lithium secondary battery prepared in each of Examples 1 to 4, the ratio $A_{1X}/A_1$ of the total area $A_{1X}$ of the first protrusions to the area $A_1$ of the first surface is greater than the ratio $A_{2X}/A_2$ of the total area $A_{2X}$ of the second protrusions to the area $A_2$ of the second surface. The lithium secondary batteries prepared in Examples 1 to 4 have a negative-electrode expansion coefficient of 102% to 116%, that is, a significantly low negative-electrode expansion coefficient as compared to the lithium secondary batteries prepared in Comparative Examples 1 to 3. In the lithium secondary batteries prepared in Examples 1 to 4, even if the volume of deposited lithium metal increases, the increase in volume thereof can be absorbed because spaces in which a larger amount of lithium metal is deposited are placed on the second surface side. This probably reduces the expansion of the negative electrodes.

In a lithium secondary battery according to the present disclosure, the expansion of a negative electrode can be reduced and therefore high discharge capacity is likely to be obtained. Therefore, the lithium secondary battery is useful for various applications such as electronic devices including mobile phones, smartphones, and tablet terminals; electric vehicles including hybrid vehicles and plug-in hybrid vehicles; and home storage batteries combined with solar cells.

What is claimed is:

1. A lithium secondary battery comprising:
a nonaqueous electrolyte having lithium ion conductivity; and
an electrode group including:
a positive electrode containing a positive electrode active material containing lithium;
a negative electrode including a negative electrode current collector; and
a separator disposed between the positive electrode and the negative electrode, wherein:
the positive electrode, the negative electrode, and the separator of the electrode group are wound,
the negative electrode current collector has a first surface facing an outward direction of the winding of the electrode group and a second surface facing an inward direction of the winding of the electrode group,
lithium metal is deposited on the first surface and the second surface by charge,
the negative electrode further includes first protrusions protruding from the first surface and second protrusions protruding from the second surface, wherein the first protrusions and the second protrusions consist essentially of a resin material,
a ratio $A_{1X}/A_1$ is greater than a ratio $A_{2X}/A_2$, where $A_{1X}$ is a sum of projected areas of the first protrusions on the first surface, $A_1$ is an area of the first surface, $A_{2X}$ is a sum of projected areas of the second protrusions on the second surface, and $A_2$ is an area of the second surface,
a first average height $h_1$ of the first protrusions from the first surface is equal to a second average height $h_2$ of the second protrusions from the second surface,
the sum $A_{1X}$ of the projected areas of the first protrusions on the first surface is the sum of the areas of projection images formed by projecting the first protrusions onto the first surface in a thickness direction of the negative electrode current collector, and
the sum $A_{2X}$ of the projected areas of the second protrusions on the second surface is the sum of the areas of projection images formed by projecting the second protrusions onto the second surface in the thickness direction of the negative electrode current collector.

2. The lithium secondary battery according to claim 1, wherein the negative electrode current collector includes copper foil or copper alloy foil.

3. The lithium secondary battery according to claim 1, wherein
the first protrusions and the second protrusions are in contact with the separator, and
the lithium metal is deposited in spaces between the negative electrode current collector and the separator during the charge.

4. The lithium secondary battery according to claim 1, wherein
material of the first protrusions is different from material of the negative electrode current collector, and
material of the second protrusions is different from the material of the negative electrode current collector.

5. The lithium secondary battery according to claim 1, wherein
a proportion $(A_{1X}/A_1) \times 100\%$ of the sum $A_{1X}$ of the projected areas of the first protrusions on the first surface in the area $A_1$ of the first surface is equal to or more than 0.4% and less than or equal to 70%, and
a proportion $(A_{2X}/A_2) \times 100\%$ of the sum $A_{2X}$ of the projected areas of the second protrusions on the second surface in the area $A_2$ of the second surface is equal to or more than 0.2% and less than or equal to 68%.

6. The lithium secondary battery according to claim 1, wherein
the first average height $h_1$ of the first protrusions from the first surface is equal to or more than 15 μm and less than or equal to 120 μm, and
the second average height $h_2$ of the second protrusions from the second surface is equal to or more than 15 μm and less than or equal to 120 μm.

7. The lithium secondary battery according to claim 1, wherein
- the first surface includes at least one band-shaped first region in which none of the first protrusions are placed along a longitudinal direction or a lateral direction, and
- the second surface includes at least one band-shaped second region in which none of the second protrusions are placed along the longitudinal direction or the lateral direction, wherein
- in each of the first and second surfaces of the negative electrode current collector, a direction perpendicular to a winding axis of the electrode group is defined as the longitudinal direction and a direction parallel to the winding axis is defined as the lateral direction.

8. The lithium secondary battery according to claim 1, wherein
- the nonaqueous electrolyte contains lithium ions and anions, and
- the anions include at least one type of anion selected from the group consisting of $PF_6^-$ ions, anions of imides, and anions of oxalate complexes.

\* \* \* \* \*